(12) United States Patent
Brandt (10) Patent No.: US 12,076,721 B2
(45) Date of Patent: Sep. 3, 2024

(54) SYSTEMS AND METHODS FOR TESTING THE INTEGRITY OF A VIRUS REMOVAL FILTER

(71) Applicant: Asahi Kasei Bioprocess America, Inc., Glenview, IL (US)

(72) Inventor: Michael D. Brandt, Cassopolis, MI (US)

(73) Assignee: Asahi Kasei Bioprocess America, Inc., Glenview, IL (US)

( * ) Notice: Subject to any disclaimer, the term of this patent is extended or adjusted under 35 U.S.C. 154(b) by 457 days.

(21) Appl. No.: 17/306,377

(22) Filed: May 3, 2021

(65) Prior Publication Data

US 2022/0347684 A1   Nov. 3, 2022

(51) Int. Cl.
 *B01L 3/00*   (2006.01)
(52) U.S. Cl.
 CPC ... *B01L 3/502738* (2013.01); *B01L 2300/049* (2013.01); *B01L 2400/06* (2013.01)
(58) Field of Classification Search
 CPC ............... B01L 2300/049; B01L 2400/06
 See application file for complete search history.

(56) References Cited

U.S. PATENT DOCUMENTS

| | | |
|---|---|---|
| 4,872,974 A | 10/1989 | Hirayama et al. |
| 4,881,176 A | 11/1989 | Kononov |
| 9,095,801 B2 | 8/2015 | Stering |
| 9,447,890 B2 | 9/2016 | Jennings et al. |
| 10,376,844 B2 | 8/2019 | Adhikari et al. |
| 2003/0234211 A1 | 12/2003 | Seiler et al. |
| 2006/0112757 A1 | 6/2006 | Morse |
| 2009/0218285 A1 | 9/2009 | Hank |
| 2015/0020504 A1 | 1/2015 | Nicole et al. |
| 2016/0258944 A1* | 9/2016 | Wiktor ............. G01N 33/54366 |

FOREIGN PATENT DOCUMENTS

CN    87104354 A    1/1988

OTHER PUBLICATIONS

International Search Report and Written Opinion, corresponding International Application No. PCT/US2022/027364, dated Jul. 4, 2022.

(Continued)

*Primary Examiner* — Natalia Levkovich
(74) *Attorney, Agent, or Firm* — MARSHALL, GERSTEIN & BORUN LLP (57) ABSTRACT

A single-use valve arrangement that includes a valve housing, a diaphragm carried by the valve housing, a pressure sensor, and a controller coupled to the pressure sensor. The valve housing defines an inlet and an outlet, the inlet adapted to be fluidly connected to an outlet of a virus removal filter. The diaphragm divides the valve housing into a first chamber and a second chamber fluidly isolated from the first chamber. The pressure sensor is configured to measure a pressure change in the second chamber due to movement of the diaphragm responsive to a pressure change in the first chamber. The controller is configured to determine an actual leak rate of the filter based on the measured pressure change, the controller further configured to determine the integrity of the filter by comparing the actual leak rate to an expected leak rate of the filter.

16 Claims, 5 Drawing Sheets

(56) References Cited

OTHER PUBLICATIONS

Sartocheck 3 plus, Filter Integrity Test, sartorius stedim biotch. www.manualslib.com, Apr. 2016.
Planova Leak Tester (PLT-AM10) Instructions for Use, Planova BioEX Edition, Version 1.3. Oct. 1, 2018.
Palltronic Flowstar IV Integrity Test Unit, Pall Life Sciences, www.pall.com/biopharm, 2011.

* cited by examiner

SYSTEMS AND METHODS FOR TESTING THE INTEGRITY OF A VIRUS REMOVAL FILTER

FIELD OF THE DISCLOSURE

The present disclosure generally relates to virus removal filtration systems and, more particularly, to systems and methods for testing the integrity of a virus removal filter before and after use.

BACKGROUND

Pharmaceutical drugs that are manufactured, extracted, or synthesized from biological sources are required to go through virus reduction steps to mitigate the potential of viral contamination in the drug product. Similarly, blood products and derivatives are required to go through virus reduction steps to mitigate the potential of viral contamination in the product. One such known method of virus reduction is through size exclusion filtering. Through size exclusion filtering, a feed flow containing the product to be filtered is passed through a virus removal filter. The virus removal filter has a virus filtration membrane that traps viruses to be removed from the product. To trap the virus, the membrane is manufactured to have millions of voids that connect to multiple capillaries that interconnect to form a lattice the fluid must pass through to exit the filter. Therefore, a virus entrained in the fluid flow has a torturous path to find a way through the virus filter membrane to exit. On this torturous path, a virus may get trapped in or about a capillary by size exclusion. It may also be held up in a void by fluid forces or affinity to the void wall. Thus, for example, to trap a virus having a 17 nanometers ("nm") cross-sectional diameter, the capillaries must have a cross section diameter of less than 17 nm somewhere along their length or a void must retain a virus having a 17 nanometer cross-sectional diameter by fluid forces or affinity to the walls of the void.

Should the integrity of the filter membrane be compromised (e.g., because the filter membrane is damaged), a virus entrained in the fluid flow may pass through or around the membrane without retention. Federal regulations therefore require that the filter membrane be integrity tested pre-use (i.e., pre-filtration) and post-use (i.e., post-filtration) for all virus removal filters. Thus, various integrity tests have been developed in an attempt to satisfy these Federal regulations and to verify the structural integrity and proper operability of the filter membrane. One such test, known as the Planova Leak Tester ("PLT"), is a standalone piece of equipment that is capable of assessing the integrity of the filter membrane by measuring the diffusion and effusion of a pressurized gas (applied to the upstream side of a wetted filter membrane) through or around the filter membrane. However, the PLT suffers from several significant disadvantages. First, the PLT requires manual preparation (including manual setup with the virus removal filter) and the operation can be finicky. Moreover, and most importantly, the PLT is not ideal for pre-use and post-use testing, because pre-use testing with the PLT necessarily breaks the sterility of the virus removal filter, and because post-use testing with the PLT may serve to contaminate the PLT with the used filter. And the PLT is not readily cleanable, so the same PLT cannot be used for both pre-use and post-use testing. Another such test is known as the visual leak test ("VLT"). The VLT involves applying a pressurized gas to the upstream side of a wetted membrane. The pressurized gas diffuses through the membrane and causes bubbles on the downstream side of the membrane. One or more operators visually inspect the outlet of the virus removal filter for bubbles diffusing and effusing through or around the filter membrane. If the bubbles diffuse and effuse at a sufficient rate so that more than three or four bubbles appear or accumulate in a minute, then the operator(s) can be confident that the filter membrane is leaking or otherwise not working properly. While the VLT can be effective for pre-use and post-use testing, the VLT is a manual and subjective measurement and is therefore largely frowned upon in the industry.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, in which:

DETAILED DESCRIPTION

The present disclosure is generally directed to systems and methods for testing the integrity of a virus removal filter so as to ensure that the virus removal filter properly retains viruses from products passed therethrough. The systems and methods disclosed herein generally utilize a single-use valve arrangement that is positionable downstream of the virus removal filter and, when fluidly connected thereto, can assess the diffusion and effusion rate of the virus removal filter to determine the integrity of the virus removal filter both pre-use and post-use, thereby satisfying Federal regulations. Beneficially, the single-use valve arrangement does so in a manner that preserves the sterility of the virus removal filter and also reduces, if not eliminates, the risk for contamination, unlike the PLT described above and other known tests. Moreover, and unlike the VLT described above, the single-use valve arrangement automatically (i.e., without human intervention) determines the integrity of the virus removal filter.

Figure 1:
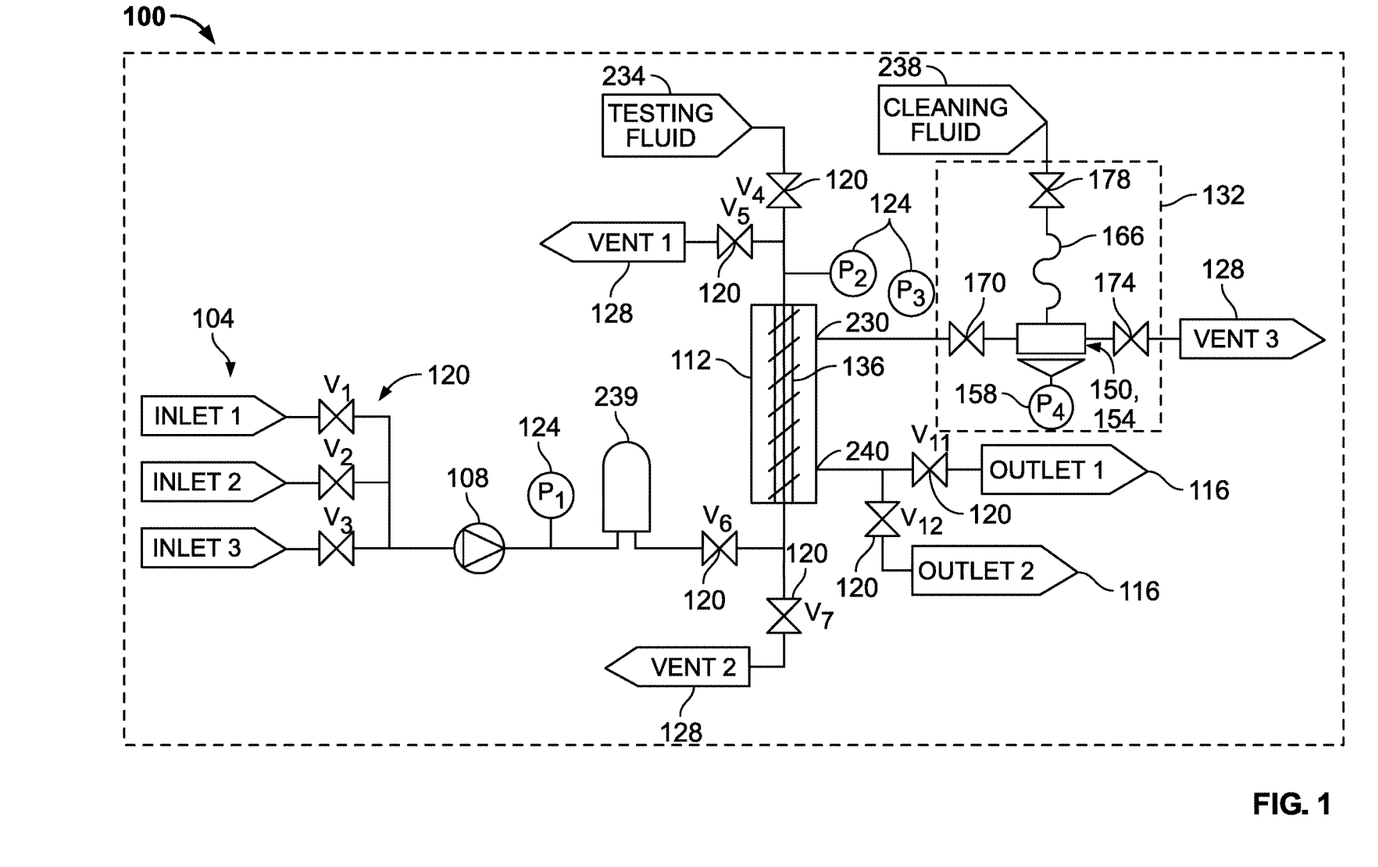
FIG. 1 is a schematic illustration of an example of a system, constructed in accordance with the teachings of the present disclosure, for filtering a product and integrity testing a virus removal filter.

FIG. 1 illustrates an example of a closed system 100 for filtering a product (e.g., a pharmaceutical drug product in solution) and constructed in accordance with the teachings of the present disclosure. The system 100 generally includes a plurality of inlets 104 (three in this example), a pump 108, a virus removal filter 112, a plurality of outlets 116, a plurality of valves 120 (nine in this example, labeled $V_1$-$V_7$, $V_{11}$, and $V_{12}$), a plurality of sensors 124 (three in this example), a plurality of vents 128 (three in this example), and a valve arrangement 132 for performing integrity testing on the virus removal filter 112. In this example, the virus removal filter 112 has a hollow fiber filtration membrane 136 that is generally configured to effect virus removal from the product flowing therethrough, which is supplied to the virus removal filter 112 by the pump 108, by trapping any viruses in the product in the membrane 136. The hollow fiber filtration membrane 136 is preferably manufactured using regenerated cellulous, e.g., by Asahi KASEI Medical Co., LTD, though the membrane 136 can instead be manufactured from a variety of materials including polysulfone or polyvinylidene fluoride. In other examples, and as will be described in greater detail below, the virus removal filter 112 can instead be a different type of virus removal filter (e.g., a virus removal filter with a sheet or a cartridge membrane).

Figure 2:
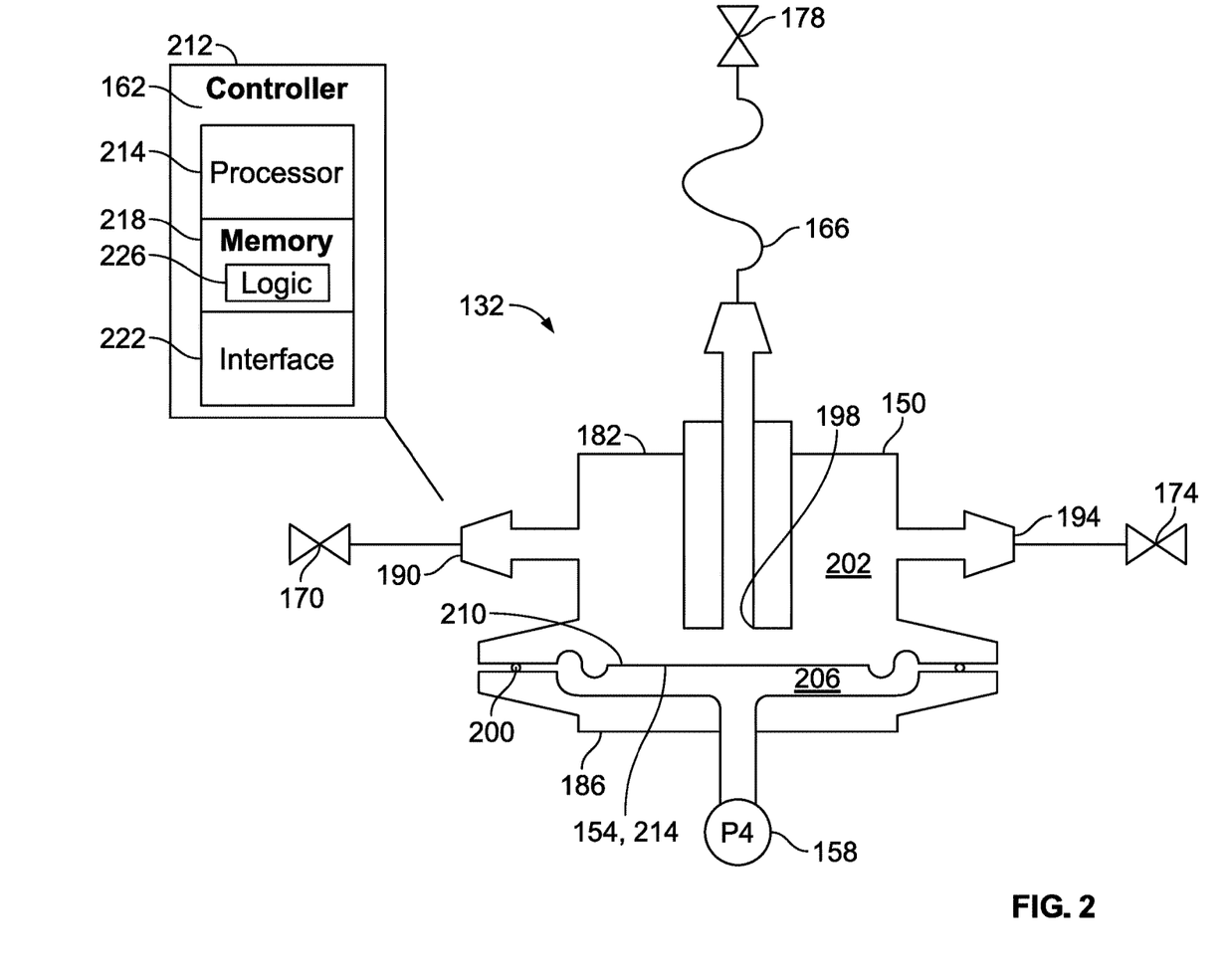
FIG. 2 illustrates a valve arrangement of the system of FIG. 1 that is configured to perform integrity testing on the virus removal filter.

FIG. 2 illustrates further details about the valve arrangement 132 employed in the system 100. In this example, the valve arrangement 132 includes a valve housing 150, a diaphragm 154 carried by the valve housing 150, and a pressure sensor 158 carried by the valve housing 150. In this example, the valve arrangement 132 also includes an air trap 166 coupled to the valve housing 150 as well as three shutoff valves 170, 174, and 178 configured to selectively shutoff various components of the valve arrangement 132. In other examples, however, the valve arrangement 132 can include more, less, or different components. As an example, while the valve arrangement 132 does not include a spring in the valve housing 150, in other examples the valve arrangement 132 can include such a spring to bias the diaphragm 154 to a specific position. As another example, while the air trap 166 is positioned externally of the valve housing 150, in other examples the air trap 166 can be partially or wholly positioned within the valve housing 150.

As illustrated in FIG. 2, the valve housing 150 in this example is defined by two housing portions that are separately manufactured and then coupled to one another. More particularly, the valve housing 150 in this example is defined by a first housing portion 182 and a second housing portion 186 (which can also be referred to as a pressure sensor housing) removably coupled to one another via a sanitary clamp (aka tri-clamp) (not shown). In other examples, however, the first housing portion 182 and the second housing portion 186 can be coupled to one another in a different manner (e.g., non-removably coupled to one another). For example, the first housing portion 182 and the second housing portion 186 can be integrally formed with one another, such that the valve housing 150 is a monolithic structure. In any event, the valve housing 150 defines an inlet 190, an outlet 194, and an air trap inlet 198. In this example, both the inlet 190 and the outlet 194 are defined by the first housing portion 182, though in other examples, the inlet 190 and/or the outlet 194 can instead be defined by the second housing portion 186. Meanwhile, the air trap inlet 198 is preferably disposed between the inlet 190 and the outlet 194. Thus, in this example, the air trap inlet 198 is also defined by the first housing portion 182.

The diaphragm 154 is generally configured to provide an aseptic interface to the pressure sensor 158 and to shutoff the bubble trap 166 when desired. As illustrated in FIG. 2, the diaphragm 154 in this example is coupled (e.g., glued or welded) to a bottom surface of the first housing portion 182. When the second housing portion 186 is coupled to the first housing portion 182, the diaphragm 154 is captured by and between the first housing portion 182 and the second housing portion 186 of the valve housing 150. In some examples, one or more seals (e.g., a sealing gasket 200) can also be disposed between the first housing portion 182 and the second housing portion 186, when coupled to one another. With the diaphragm 154 so arranged, the diaphragm 154 divides the valve housing 150 into two chambers, a first chamber 202 and a second chamber 206. The first chamber 202 is defined adjacent a first side 210 of the diaphragm 154 and is in fluid communication with each of the inlet 190, the outlet 194, and the air trap inlet 198. The second chamber 206 is defined adjacent a second side 214 of the diaphragm 154 opposite the first side 210. The diaphragm 154 serves to effect a barrier between the first chamber 202 and the second chamber 206 such that the second chamber 206 is fluidly isolated from the first chamber 202. As a result, at least in this example, the second chamber 206 is fluidly isolated from the inlet 190, the outlet 194, and the air trap inlet 198. The diaphragm 154 also serves to effect a barrier to the external environment when the second housing portion 186 is removed from the first housing portion 182.

The diaphragm 154 is generally movable responsive to a pressure change in the first chamber 202 caused by, for example, opening or closing the inlet 190, opening or closing the outlet 194, more or less fluid flowing through the inlet 190, or more or less fluid flowing through the outlet 194. When, for example, the pressure in the first chamber 202 increases, the diaphragm 154 moves in a first direction (downward in the orientation shown in FIG. 2), away from the inlet 190, the outlet 194, and the air trap inlet 198, and toward the pressure sensor 158. Movement of the diaphragm 154 in this manner decreases the volume of the second chamber 206, which in turn serves to increase the pressure in the second chamber 206. Conversely, when the pressure in the first chamber 202 decreases, the diaphragm 154 moves in a second direction (upward in the orientation shown in FIG. 2), toward the inlet 190, the outlet 194, and the air trap inlet 198, and away from the pressure sensor 158. Movement of the diaphragm 154 in this manner increases the volume of the second chamber 206, which in turn serves to decrease the pressure in the second chamber 206.

The pressure sensor 158 is generally configured to measure the pressure change in the first chamber 202. In this example, the pressure sensor 158 is carried by the second housing portion 186, such that the pressure sensor 158 interfaces with the second side 214 of the diaphragm 154 and is in fluid communication (and more particularly direct fluid communication) with the second chamber 206. As such, the pressure sensor 158 is configured to indirectly measure the pressure change in the first chamber 202 by directly measuring the pressure change in the second chamber 206 caused by the diaphragm 154 moving responsive to the pressure change in the first chamber 202. In some cases, the pressure change in the second chamber 206 will exactly match the pressure change in the first chamber 202, while in other cases, the pressure change in the second chamber 206 will be linearly related (or correspond in some other manner) to the pressure change in the first chamber 202. In other examples, however, the pressure sensor 158 can be positioned to be in direct fluid communication with the first chamber 202.

The air trap 166 is generally configured to trap a volume of air (or other compressible fluid) to dampen pressure increases in the first chamber 202. In this example, the air trap 166 is a piece of plastic tubing that is directly coupled to the air trap inlet 198 (e.g., by way of a barb connection protruding outward from the valve housing 150) and which can be pinched off by the third shutoff valve 178 at a desired length to trap a pre-determined volume of air. Thus, generally speaking, the length of the tubing determines the pre-determined volume of air to be stored therein. In one example, the length of the tubing forming the air trap 166 is equal to approximately 13 inches, such that the pre-determined volume is equal to approximately 29 ml. In other examples, the air trap 166 can be partially or entirely integrated into the valve housing 150 (and, more particularly, the first housing portion 182), in which case shorter length tubing would be required to maintain the same pre-determined volume.

With reference back to FIG. 1, the first shutoff valve 170 is coupled to the valve housing 150 such that the first shutoff valve 170 is disposed upstream of the inlet 190. The first shutoff valve 170 has an open position, in which the valve 170 allows fluid to flow to and through the inlet 190, and a closed position, in which the valve 170 prevents fluid from flowing to and through the inlet 190. In other words, when the valve 170 is in the closed position, the valve 170 closes the inlet 190. The second shutoff valve 174 is coupled to the valve housing 150 such that the second shutoff valve 174 is disposed downstream of the outlet 194. The second shutoff valve 174 has an open position, in which the valve 174 allows fluid to flow through and out of the outlet 194, and a closed position, in which the valve 174 prevents fluid from flowing out of the outlet 194. In other words, when the valve 174 is in the closed position, the valve 174 closes the outlet 194. The third shutoff valve 178, which in this example is a pinch valve, is coupled to the air trap 166 (which is coupled to the valve housing 150) such that the third shutoff valve 178, and the length of the air trap tubing 166, define the pre-determined volume of the air trap when the third shutoff valve 178 is in a closed position. The third shutoff valve 178 has an open position, in which the valve 178 allows air to flow through the air trap 166 and out the air trap inlet 198, and the closed position mentioned above, in which the valve 178 traps the pre-determined volume of air in the air trap 166.

As also illustrated in FIG. 2, the valve arrangement 132 also includes a controller 162 that is communicatively connected (via one or more wired and/or one or more wireless connections) to the components of the valve arrangement 132 and other components of the system 100 as needed to control operation of the valve arrangement 132. In particular, the controller 162 controls the first, second, and third shutoff valves 170, 174, and 178 to open or close the inlet 190, the outlet 194, and the air trap 166, respectively, as desired. Thus, for example, the controller 162 controls the second shutoff valve 170 to open or close the outlet 194 as desired.

In this example, the controller 162 includes a module base 212 and a processor 214 disposed within the module base 212, a memory 218 disposed within the module base 212, a communications interface 222 within the module base 212, and computing logic 226. Though not depicted herein, these components are arranged in a known manner, but can be arranged in any manner. The processor 214 can be a general processor, a digital signal processor, ASIC, field programmable gate array, graphics processing unit, analog circuit, digital circuit, or any other known or later developed processor. The processor 214 operates pursuant to computer-readable instructions stored in the memory 218. The memory 218 may be a volatile memory or a non-volatile memory. The memory 218 may include one or more of a read-only memory (ROM), random-access memory (RAM), a flash memory, an electronic erasable program read-only memory (EEPROM), or other type of memory. The memory 218 may include an optical, magnetic (hard drive), or any other form of data storage device. The communications interface 222 is provided to enable or facilitate electronic communication between the controller 162 and the components of the valve arrangement 132. This electronic communication may occur via any known communication protocol. The logic 226 includes one or more routines and/or one or more sub-routines, embodied as the computer-readable instructions stored on the memory 204. The controller 162, particularly the processor 214 thereof, can execute the logic 226 to cause the processor 214 to perform actions related to the integrity testing of the virus removal filter 112, as will be described in greater detail below.

With reference back to FIG. 1, the valve arrangement 132 is fluidly coupled to the virus removal filter 112 such that the valve arrangement 132 is disposed downstream of the virus removal filter 112 and is fluidly connected to a shell outlet 230 of the virus removal filter 112. In turn, the first shutoff valve 170 is disposed between the shell outlet 230 and the inlet 190 of the valve housing 150, with the remaining components of the valve arrangement 132 disposed downstream of the shell outlet 230 of the virus removal filter 112 (some components are also disposed downstream of the valve housing 150). Additionally, the valve arrangement 132 is downstream of one of the plurality of sensors 124, upstream of one of the plurality of vents 128, downstream of the remaining vents of the plurality of vents 128, downstream of a source 234 of testing fluid (pressurized air in this example, though other compressible fluids can be used), and downstream of a source 238 of cleaning fluid (pressurized air in this example, though other compressible fluids can be used).

During normal filtration operation of the system 100, the product is fed into and through the virus removal filter 112, and at least the first shutoff valve 170 is closed. More particularly, the pump 108 draws the product from one or more of the plurality of inlets 104 and passes the product through various components (e.g., one of the plurality of sensors 124, a pre-filter 239, and one of the plurality of valves 120) and into the virus removal filter 112. Once in the virus removal filter 112, the product will pass through the filtration membrane 136 of the filter 112. As discussed above, the filtration membrane 136 has a lattice structure that consists of various interconnected voids and capillaries having diameters smaller than the cross section of the virus that is to be removed from the product. This lattice structure forms a tortuous path for the product to flow through, which entraps any viruses contained in and to be removed from the product. After passing through the filtration membrane 136, the product then exits the filter 112 through filtrate outlet 240 and can be exhausted from the system 100 via one of the plurality of outlets 116.

As discussed above, the valve arrangement 132 is configured to automatically perform integrity testing on the virus removal filter 112 both prior to and after this normal filtration operation of the system 100 (and the virus removal filter 112) in order to ensure that the filter 112 is installed and operating properly and the filtration membrane 136 is sufficiently integral (such that the viruses do not pass through or around the membrane 136). To perform the integrity testing, the following steps are generally performed by the controller 162 (though in some examples, one or more of these steps can be manually performed): (1) the controller 162 causes the air trap 166 to be purged, by directing pressurized air from the cleaning fluid source 238 through the air trap 166, through the air trap inlet 198, through the valve housing 150, out of the valve housing 150 via the valve outlet 194, and to the vent 128 downstream of the valve arrangement 132, (2) the controller 162 causes the third shutoff valve 178 to move to its closed position to shut off the air trap 166 (thus pinching at a prescribed position in the tubing to define the volume of the air trap 166), (3) the controller 162 causes the filtration membrane 136 to be wetted and the outlets 116 to be flooded (by directing a wetting agent supplied by one of the plurality of inlets 104 to and through the filtration membrane 136, out of the filter 112 via the filtrate outlet 240, and to the outlets 116), (4) the controller 162 causes the valve 150 to be flooded (by directing a flooding agent supplied by one of the plurality of inlets 104 to and through the filtration membrane 136, out of the filter 112 via the shell outlet 230 of the filter 112, through the valve housing 150, out of the valve housing 150 via the outlet 194, and to the vent 128 downstream of the valve arrangement 132), (5) the controller 162 directs testing fluid (which in this example is pressurized air) from the source 234 of testing fluid toward the filtration membrane 136, which is pressurized with the testing fluid until the fibers of the filtration membrane 136 are in an equilibrium position, at which time (6) the controller 162 opens the first shutoff valve 170 (if not already open), and closes the second shutoff valve 174 (if not already closed). The pressurized testing fluid will in turn begin to diffuse through the filtration membrane 136 of the filter 112. In some cases, the pressurized testing fluid will also effuse through and/or around the filtration membrane 136. Because the system 100 is a closed one, diffusion (and effusion) of the testing fluid displaces the fluid downstream of the filtration membrane 136, thereby increasing the pressure at the shell outlet 230, and, in turn, at the inlet 190 of the valve housing 150.

The diffusion of the pressurized testing fluid through the filtration membrane 136 will generally be defined according to the following formula:

$$N = DL\frac{\Delta p}{d}F,$$

where N=the diffusion rate per second, D=Diffusion coefficient, L=Solubility coefficient of the testing fluid in the wetting fluid, $\Delta p$=Differential pressure available at the membrane 136, d=Liquid layer thickness in the membrane 136, and F=Effective filter area. It will thus be appreciated that different wetting fluids (applied to the membrane 136) and different testing fluids will yield different diffusion values on account of the different solubility coefficients. Meanwhile, the effusion of the pressurized testing fluid through the filtration membrane 136 is assumed to follow the principles of choked flow and to be proportional to the pinhole area on the plane of the inner surface of the fibers of the membrane 136. In particular, the effusion is generally defined according to the following formula:

$$Q = k\pi r^2 \times P_{abs} \times \sqrt{\frac{273+t}{298}},$$

where Q is the effusion rate (mL/min at ambient pressure), k is a coefficient, r is the radius of the pinhole (μm), $P_{abs}$ is the absolute pressure ($P_{gauge}$+101.3) (kPa) and t is the air temperature, which is the same as water and ambient temperature (° C.).

The pressure increase at the inlet 190 serves to increase the pressure in the first chamber 202, thereby causing the diaphragm 154 to move in the first direction from a first position (e.g., the position shown in FIG. 2) to a second position. Movement of the diaphragm 154 from the first position to the second position therefore serves to also increase the pressure in the second chamber 206. The pressure sensor 158 is configured to measure this pressure increase in the second chamber 206 over a pre-determined time interval (e.g., 5 seconds). For example, the pressure sensor 158 is configured to measure the pressure in the second chamber 206 at a first point in time (e.g., when the diaphragm 154 is in the first position) and the pressure in the second chamber 206 at a second point in time later than the first point in time (e.g., when the diaphragm 154 is in the second position), with the time interval being the time between the first point in time and the second point in time.

The controller 162 is configured to determine an actual leak rate of the vim s removal filter 112, which corresponds to the amount of the testing fluid per second that actually diffuses and effuses through and/or around the membrane 136 over the pre-determined time interval. The controller 162 is generally configured to determine the actual leak rate based on the measured pressure increase downstream of the membrane 136, which serves as a proxy for the amount of the testing fluid per second that diffuses and effuses through and/or around the membrane 136 over the pre-determined time interval. As an example, if the pressure sensor 158 measures a pressure of 50 Pa in the second chamber 206 at the first point in time, and a pressure of 100 Pa in the second chamber 206 at the second point in time (5 seconds later), the controller 162 determines that the actual leak rate of the virus removal filter 112 is 50 Pa per 5 second time interval or 10 Pa per second.

The controller 162 is configured to subsequently compare the determined actual leak rate to an expected leak rate of the virus removal filter 112. The expected leak rate is typically determined prior to the integrity testing and stored in the memory 218 of the controller 162, though in some cases the expected leak rate can be determined during the integrity testing. The expected leak rate can be determined by the controller 162 or determined by an operator of the system 100. In any event, the expected leak rate generally refers to the amount of the testing fluid per second that is expected to diffuse and effuse through and/or around the membrane 136 over the pre-determined time interval when the filter 112 is installed and operating properly and when the filtration membrane 136 is sufficiently integral. The expected leak rate can be determined by analyzing how the testing fluid has in the past diffused and effused through and/or around the membrane 136, parameters such as the testing fluid, the diffusion coefficient, the solubility coefficient of the testing fluid in the wetting fluid, the differential pressure available at the membrane 136, the liquid layer thickness in the membrane 136, the effective filter area, and other parameters associated with the filter 112.

The controller 162 is in turn configured to determine the integrity of the virus removal filter 112 based on this comparison. In some cases, the controller 162 determines that the virus removal filter 112 is of sufficient integrity (i.e., the filter 112 is installed and operating properly and the membrane 136 is sufficiently integral) for further use when the controller 162 determines that the actual leak rate is less than or equal to the estimated leak rate of the virus removal filter 112. In some cases, the controller 162 determines that the virus removal filter 112 is of sufficient integrity for further use when the controller 162 determines that the actual leak rate is greater than the estimated leak rate of the virus removal filter but is within a pre-determined threshold difference of, for example, 10% to the expected leak rate of the virus removal filter 112. Conversely, when the controller 162 determines that the actual leak rate is greater than the expected leak rate or is greater than the expected leak rate to a degree beyond the pre-determined threshold difference, the controller 162 attributes the difference between the actual leak rate and the expected leak rate to unexpected diffusion and effusion of the testing fluid around or through the membrane 136 of the virus removal filter 112. In other words, the controller 162 attributes the difference to leakage around or through the membrane 136, caused by, for example, the filter 112 not being installed and/or operating properly and/or being compromised. Accordingly, the controller 162 determines that the virus removal filter 112 is of less than sufficient integrity, so is not suitable for further use. In some examples, the controller 162 can in turn indicate (e.g., via an alert to the operator of the system 100) that the virus removal filter 112 (or components thereof) needs to be re-installed and/or replaced.

Figure 3:
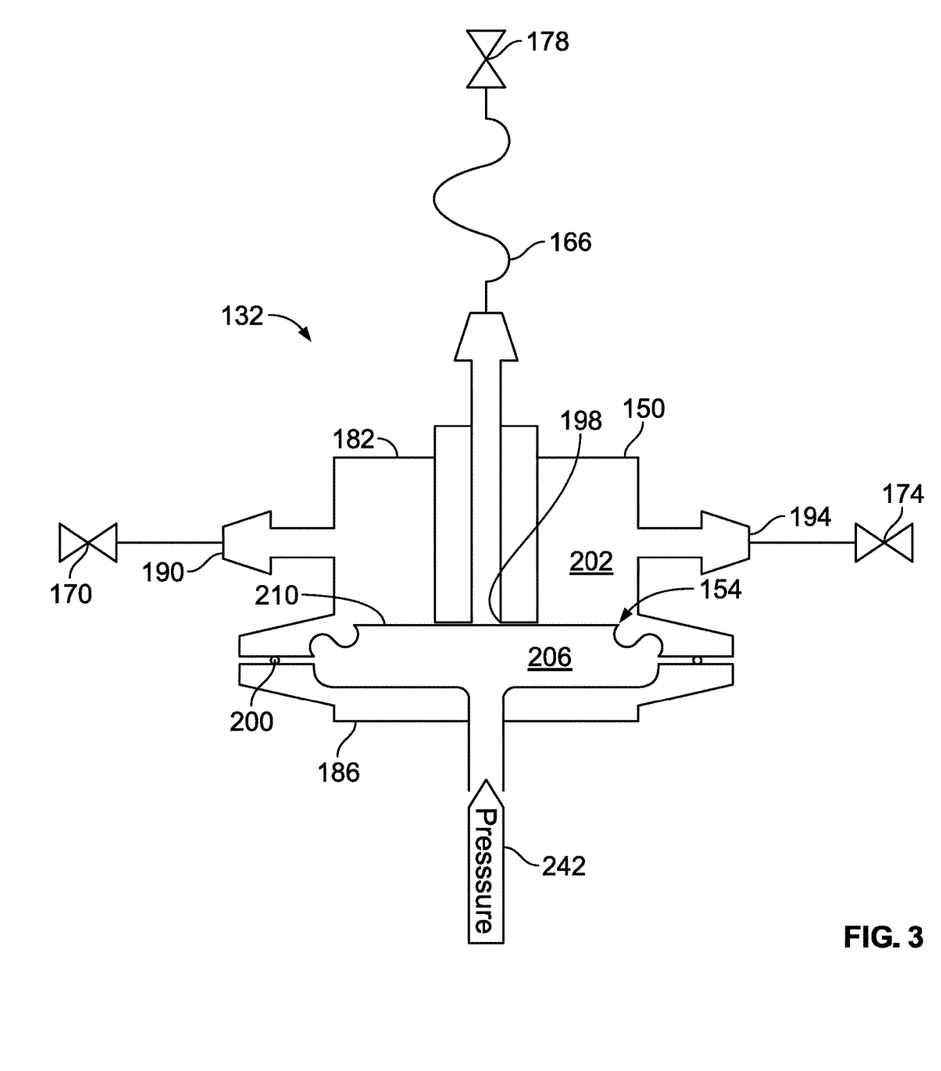
FIG. 3 is similar to FIG. 2, but shows a diaphragm of the valve arrangement positioned against an air trap inlet of the valve arrangement to close an air trap coupled thereto.

After the integrity test has been performed by the valve arrangement 132, the controller 162 is configured to (7) close the first shutoff valve 170 and/or open the second shutoff valve 174, and (8) cease directing the testing fluid from the source 234 of testing fluid toward the filtration membrane 136. When the integrity test is performed prior to normal operation of the system 100, and so long as the valve arrangement 132 determines that the membrane 136 is sufficiently integral and the filter 112 is installed and operating properly, the product can be fed into and through the virus removal filter 112 by the pump 108 for normal filtration by the virus removal filter 112. Additionally, when desired (e.g., when it is desired to measure the volume of the air trap 166), the air trap 166 can be closed by moving the diaphragm 154 into sealing engagement with the air trap inlet 198. In some examples, such as the one illustrated in FIG. 3, the diaphragm 154 can be so moved and the air trap 166 can be closed by selectively supplying a pressurized fluid from a source 242 of pressurized fluid to the second chamber 206.

It will be appreciated that the valve arrangement 132 described herein is a single-use valve arrangement. More particularly, at least a portion of the components of the valve arrangement 132. In this example, the first housing portion 182, the diaphragm 154, the bubble trap 166, and the tubing used to fluidly connect the components of the valve arrangement 132 are single-use components. To this end, these components of the valve arrangement 132 are made from a disposable material, such as a plastic material like gamma stable plastic, with the remaining components made from a more permanent material (e.g., in this example the second housing portion 186 and the pressure sensor 158 are made from stainless steel). In other examples, however, more components of the valve arrangement 132 can be single-use components made from a disposable material. As an example, the controller 162 can be a single-use component. In any event, because the valve arrangement 132 is a single-use valve arrangement, the valve arrangement 132 can be used to perform integrity testing on the virus removal filter 112 prior to and/or after normal operation of the system 100, then the single-use components of the valve arrangement 132 can be subsequently discarded.

Figure 4:
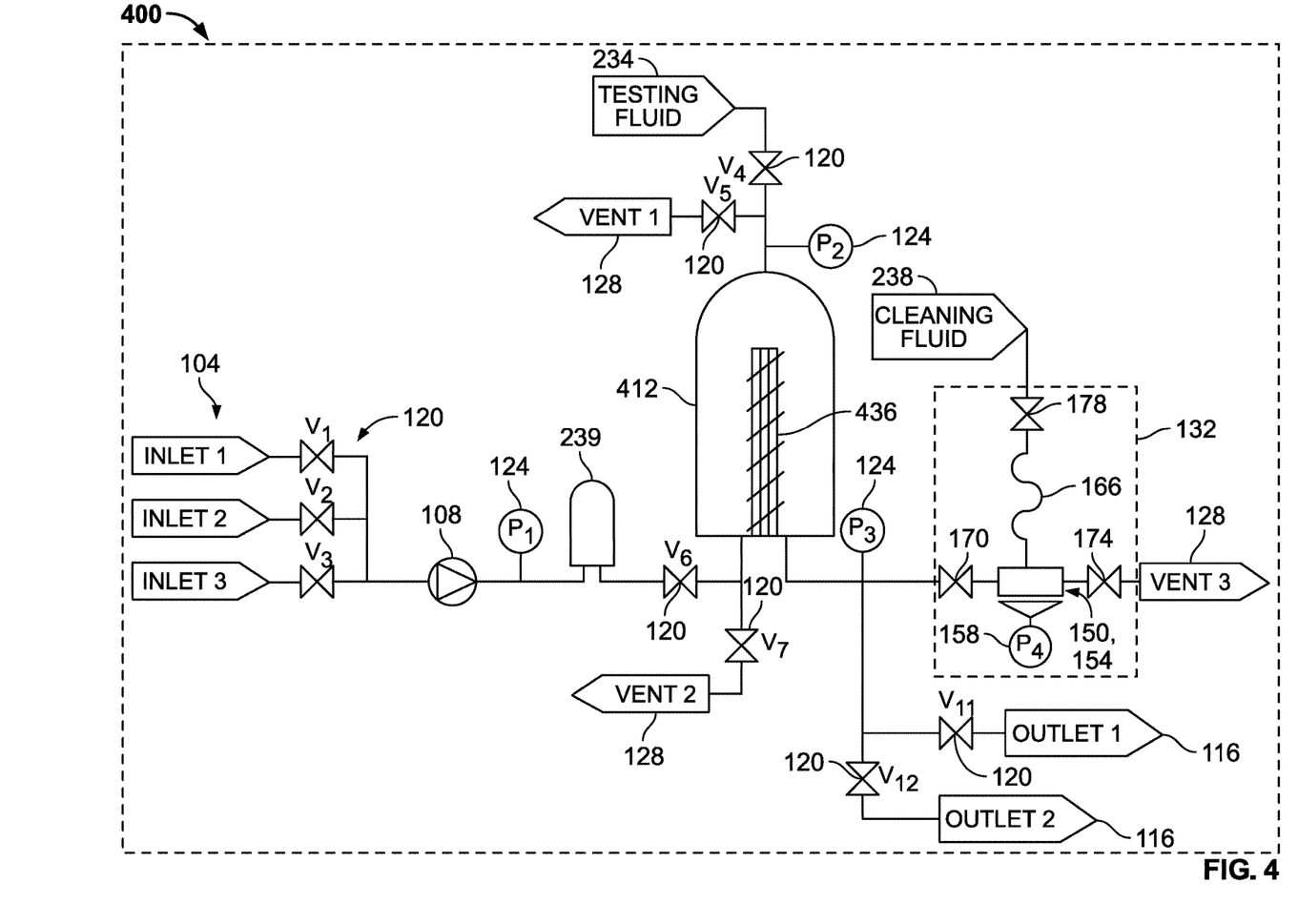
FIG. 4 is a schematic illustration of another example of a system, constructed in accordance with the teachings of the present disclosure, for filtering a product and integrity testing a virus removal filter.

FIG. 4 illustrates another example of a closed system 400 for filtering a product (e.g., a pharmaceutical drug product in solution) and constructed in accordance with the teachings of the present disclosure. The system 400 illustrated in FIG. 4 is substantially similar to the system 100 illustrated in FIG. 1, with common components depicted using common reference numerals, but is different in that the system 400 includes a different type of virus removal filter than the system 100. More specifically, the system 400 includes a virus removal filter 412 that has a cartridge filtration membrane 436 (instead of a hollow fiber filtration membrane like the filter 112). However, like the hollow filtration membrane 136, the cartridge filtration membrane 436 is configured to effect virus removal from the product flowing therethrough, which is supplied to the virus removal filter 412 by the pump 108. Despite the difference between the system 100 and the system 400, the valve arrangement 132 can be used to perform integrity testing on the virus removal filter 412 just as described above in connection with the virus removal filter 112.

Figure 5:
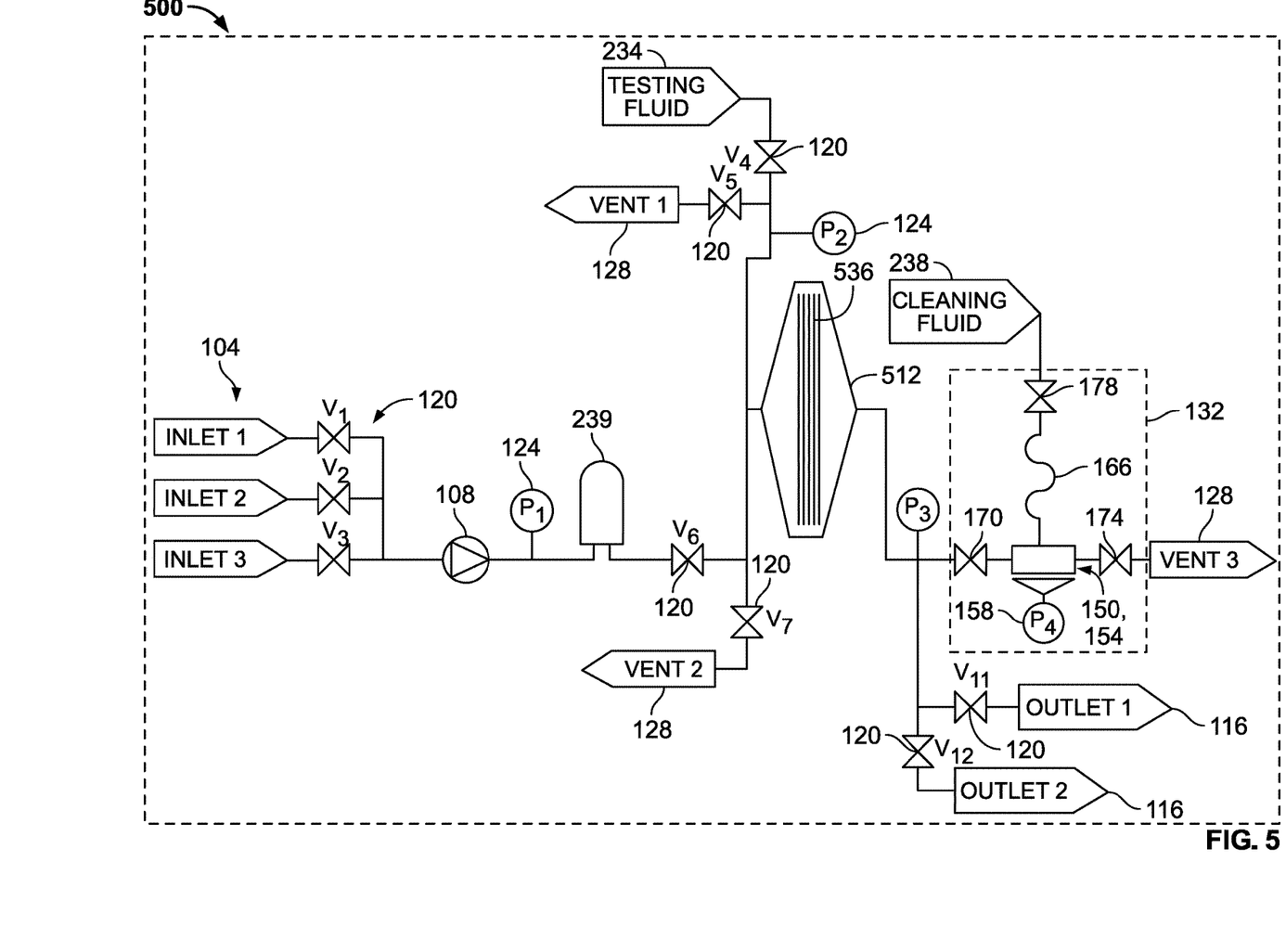
FIG. 5 is a schematic illustration of another example of a system, constructed in accordance with the teachings of the present disclosure, for filtering a product and integrity testing a virus removal filter.

FIG. 5 illustrates another example of a closed system 500 for filtering a product (e.g., a pharmaceutical drug product in solution) and constructed in accordance with the teachings of the present disclosure. The system 500 illustrated in FIG. 5 is substantially similar to the systems 100 and 400 illustrated in FIGS. 1 and 4, respectively, with common components depicted using common reference numerals, but is different in that the system 500 includes a different type of virus removal filter than the systems 100 and 400. More specifically, the system 500 includes a virus removal filter 512 that has a sheet membrane 536 (instead of a hollow fiber filtration membrane like the filter 112 or a cartridge filtration membrane like the filter 412). However, like the membranes 136 and 436, the sheet membrane 536 is configured to effect virus removal from the product flowing therethrough, which is supplied to the virus removal filter 512 by the pump 108. Despite the difference between the systems 100 and 400 and the system 500, the valve arrangement 132 can be used to perform integrity testing on the virus removal filter 512 just as described above in connection with the virus removal filter 112.

Those skilled in the art will recognize that a wide variety of modifications, alterations, and combinations can be made with respect to the above described embodiments without departing from the scope of the disclosure, and that such modifications, alterations, and combinations are to be viewed as being within the ambit of the inventive concept.

The invention claimed is:

1. A valve arrangement for testing the integrity of a virus removal filter, the valve arrangement comprising:
   a valve housing having an inlet and an outlet, the inlet adapted to be fluidly connected to an outlet of the virus removal filter;
   a diaphragm carried by the valve housing, wherein the diaphragm divides the valve housing into a first chamber and a second chamber fluidly isolated from the first chamber, the first chamber in fluid communication with both the inlet and the outlet, and wherein the diaphragm is movable responsive to a pressure change in the first chamber;
   a pressure sensor in fluid communication with the second chamber, the pressure sensor configured to measure a pressure change in the second chamber due to movement of the diaphragm responsive to the pressure change in the first chamber; and
   a controller coupled to the pressure sensor and programmed to determine an actual leak rate of the virus removal filter based on the measured pressure change, the controller further programmed to determine the integrity of the virus removal filter by comparing the actual leak rate to an expected leak rate of the virus removal filter.

2. The valve arrangement of claim 1, wherein the valve housing further has an air trap inlet.

3. The valve arrangement of claim 2, wherein the air trap inlet is defined between the inlet and the outlet.

4. The valve arrangement of claim 2, wherein the diaphragm is carried by the valve housing such that the diaphragm is movable to a position in which the diaphragm engages the air trap inlet, thereby closing the air trap inlet.

5. The valve arrangement of claim 2, further comprising an air trap coupled to the air trap inlet.

6. The valve arrangement of claim 1, further comprising an inlet shutoff valve disposed upstream of the inlet.

7. The valve arrangement of claim 1, further comprising an outlet shutoff valve disposed downstream of the outlet.

8. The valve arrangement of claim 1, wherein the controller comprises a processor and a memory, the memory configured to store the expected leak rate for the virus removal filter, the processor programmed to obtain, from the memory, the expected leak rate for the virus removal filter and determine the integrity of the virus removal filter by comparing the actual leak rate to the expected leak rate.

9. The valve arrangement of claim 1, wherein a portion of the valve housing and the diaphragm of the valve arrangement are made from a disposable material, such that the valve arrangement is a single-use valve arrangement.

10. A single-use valve arrangement for testing the integrity of a virus removal filter, the valve arrangement comprising:
   a valve housing having an inlet, an outlet, and an air trap inlet, the inlet adapted to be fluidly connected to an outlet of the virus removal filter;
   a diaphragm carried by the valve housing, wherein the diaphragm divides the valve housing into a first chamber and a second chamber fluidly isolated from the first chamber, the first chamber in fluid communication with both the inlet and the outlet, and wherein the diaphragm is movable from a first position to a second position responsive to a pressure change in the first chamber;
   a pressure sensor in fluid communication with the second chamber, the pressure sensor configured to measure a first pressure in the second chamber when the diaphragm is in the first position and a second pressure in the second chamber when the diaphragm is in the second position; and
   a controller coupled to the pressure sensor and programmed to determine an actual leak rate of the virus removal filter based on a difference between the first pressure and the second pressure, the controller further programmed to determine the integrity of the virus removal filter by comparing the actual leak rate to an expected leak rate of the virus removal filter.

11. The valve arrangement of claim 10, wherein the air trap inlet is disposed between the inlet and the outlet.

12. The valve arrangement of claim 10, wherein the diaphragm is carried by the valve housing such that the diaphragm is movable to a third position in which the diaphragm engages the air trap inlet, thereby closing the air trap inlet.

13. The valve arrangement of claim 10, further comprising an air trap coupled to the air trap inlet.

14. The valve arrangement of claim 10, further comprising:
   an inlet shutoff valve disposed upstream of the inlet; and
   an outlet shutoff valve disposed downstream of the outlet.

15. The valve arrangement of claim 10, wherein the controller is programmed to determine that the virus removal filter is of sufficient integrity for use when the controller determines that the actual leak rate is less than the estimated leak rate, equal to the estimated leak rate, or a difference between the actual leak rate and the estimated leak rate is less than a pre-determined threshold.

16. The valve arrangement of claim 10, wherein the controller comprises a processor and a memory, the memory configured to store the expected leak rate for the virus removal filter, the processor programmed to obtain, from the memory, the expected leak rate for the virus removal filter and determine the integrity of the virus removal filter by comparing the actual leak rate to the expected leak rate.

\* \* \* \* \*